: US010442716B2

United States Patent
Capeau et al.

(10) Patent No.: US 10,442,716 B2
(45) Date of Patent: Oct. 15, 2019

(54) METHOD AND DEVICE FOR PURIFYING DOMESTIC OR INDUSTRIAL WATER

(71) Applicant: OREGE, Toussus le Noble (FR)

(72) Inventors: Patrice Capeau, Marseilles (FR); Pascal Gendrot, Jouy en Josas (FR)

(73) Assignee: OREGE, Toussus le Noble (FR)

( * ) Notice: Subject to any disclaimer, the term of this patent is extended or adjusted under 35 U.S.C. 154(b) by 0 days.

(21) Appl. No.: 15/577,610

(22) PCT Filed: May 27, 2016

(86) PCT No.: PCT/FR2016/051277
§ 371 (c)(1),
(2) Date: Nov. 28, 2017

(87) PCT Pub. No.: WO2016/193600
PCT Pub. Date: Dec. 8, 2016

(65) Prior Publication Data
US 2018/0155228 A1    Jun. 7, 2018

(30) Foreign Application Priority Data
May 29, 2015    (FR) ..................... 15 54920

(51) Int. Cl.
*C02F 11/04*    (2006.01)
*C02F 1/24*    (2006.01)
(Continued)

(52) U.S. Cl.
CPC .......... *C02F 11/04* (2013.01); *B01F 13/0227* (2013.01); *C02F 1/24* (2013.01);
(Continued)

(58) Field of Classification Search
CPC .... C02F 3/02; C02F 9/00; C02F 3/286; C02F 2001/007; C02F 2209/22; C02F 2101/105
See application file for complete search history.

(56) References Cited

U.S. PATENT DOCUMENTS 3,687,646 A * 8/1972 A Brent et al. ........... C01B 3/36
110/220
4,042,493 A 8/1977 Matsch et al.
(Continued)

FOREIGN PATENT DOCUMENTS

CN    203 568 959 U    4/2014
CN    203 602 470 U    5/2014
(Continued)

OTHER PUBLICATIONS

International Search Report dated Aug. 8, 2016, for International Application No. PCT/FR2016/051277, filed May 27, 2016.
(Continued)

*Primary Examiner* — Ana M Fortuna
(74) *Attorney, Agent, or Firm* — Christensen O'Connor Johnson Kindness PLLC

(57) ABSTRACT

A method and a device for the continuous purification of a domestic or industrial water stream. After passing through a biological reactor to obtain a sludge of between 4 and 12 g/l of Dry Solids, the method involves feeding a series of chambers separated by restrictions at a flow rate q, injecting air into a second chamber at a flow rate Q>q, in order to obtain an emulsion, injecting a flocculant into a third chamber, and recovering the degassed emulsion in a drain pan. Flocculated and aerated sludge floats on top, such that the remaining liquid centrate has a Dry Solids content less than 100 mg/l and has a positive redox potential >50 mV and a value greater than 100 mV relative to the redox potential of the sludge at the inlet of the chambers, and is reinjected upstream from or into the biological reactor.

16 Claims, 4 Drawing Sheets

(51) Int. Cl.
*C02F 3/02* (2006.01)
*C02F 11/14* (2019.01)
*B01F 13/02* (2006.01)
*C02F 3/12* (2006.01)
*C02F 11/16* (2006.01)
*C02F 3/00* (2006.01)

(52) U.S. Cl.
CPC ............... *C02F 3/006* (2013.01); *C02F 3/02* (2013.01); *C02F 11/14* (2013.01); *C02F 3/1215* (2013.01); *C02F 11/16* (2013.01); *C02F 2203/006* (2013.01); *C02F 2209/001* (2013.01); *C02F 2209/003* (2013.01); *C02F 2209/03* (2013.01); *C02F 2209/04* (2013.01); *C02F 2209/10* (2013.01); *C02F 2209/38* (2013.01); *C02F 2209/40* (2013.01); *C02F 2209/44* (2013.01); *C02F 2303/24* (2013.01); *Y02W 10/15* (2015.05); *Y02W 10/30* (2015.05); *Y02W 10/37* (2015.05)

(56) References Cited

U.S. PATENT DOCUMENTS

| | | | | |
|---|---|---|---|---|
| 5,288,406 | A * | 2/1994 | Stein | C02F 3/006 210/614 |
| 6,477,687 | B1 * | 11/2002 | Thomas | G06F 17/5072 257/E27.105 |
| 8,398,855 | B1 * | 3/2013 | Pedros | C02F 9/00 210/259 |
| 2006/0124543 | A1 * | 6/2006 | Pehrson | C02F 3/006 210/614 |
| 2008/0314837 | A1 * | 12/2008 | Vanotti | A01C 3/00 210/705 |
| 2009/0000752 | A1 * | 1/2009 | Dykstra | C02F 11/14 162/175 |
| 2010/0155327 | A1 * | 6/2010 | Woodard | C02F 3/1263 210/608 |
| 2011/0257788 | A1 * | 10/2011 | Wiemers | B01D 61/022 700/267 |

FOREIGN PATENT DOCUMENTS

| | | |
|---|---|---|
| EP | 2 354 096 A1 | 8/2011 |
| KR | 101 031 191 B1 | 4/2011 |

OTHER PUBLICATIONS

Written Opinion dated Aug. 8, 2016, for International Application No. PCT/FR2016/051277, filed May 27, 2016, 7 pages.

International Preliminary Report on Patentability dated Dec. 5, 2017, issued in corresponding International Application No. PCT/FR2016/051277, filed May 27, 2016, 1 page.

* cited by examiner

METHOD AND DEVICE FOR PURIFYING DOMESTIC OR INDUSTRIAL WATER

The present invention relates to a method for continuously purifying household or industrial waters, using a biological reactor, in which the resulting organic sludge can be thickened and dehydrated.

It also relates to a device for purification that employs such a method.

The invention finds particularly important, though not exclusive, application within the field of stations for purifying household or industrial waters, in which the sources of organic pollution are extracted from the waters, allowing in particular a thickening and/or a substantial reduction in the sludge volumes resulting from the treatment.

There are already purifying stations known which allow waters treated by biological reactors to be discharged into the environment, these reactors being devices which, by way of an oxidizing gas (air, $O_2$, ozone, etc.), allow the liquid part to be separated from the dry matter (DM) while lowering the COD.

Conventionally, this type of reactor also includes a settler/clarifier tank which in a bottom part recovers a liquid sludge with a high DM load (4 to 12 g/l) with a COD>300 mg/l and a redox potential which is low, less than 50 my, or even negative.

Stations of these kinds have drawbacks. The poor quality of the redox potential in particular gives rise to poor mineralization of the resulting sludges and hence poor subsequent anaerobic digestion, if the station comprises such a digester downstream.

The aim of the present invention is to provide a method and a device which are a better response to the demands of practice than the methods and devices hitherto known, particularly by allowing better operation of the conventional purifying stations, whether or not they are equipped with a digester, by enhancing the residence time in the biological reactor, and so enhancing the resulting clarification of the waters, by bringing about more effective mineralization of the sludges and, consequently, better dewatering, thereby ensuring that thicker and more dewatered biological sludges are produced, with a reduction in filamentous bacteria, by allowing production of a centrate (liquid obtained during the separation with the solid portions) downstream of the biological reactor that has a significantly higher redox potential, which will therefore allow a reduction to be achieved in upstream electricity consumption for the purposes of aeration.

The invention will, moreover, give rise to a sludge which is porous and has a high redox potential after dewatering and recovery of the centrates, thereby further facilitating its subsequent, more advanced dewatering.

More particularly, and where a complementary static thickener is used, a reduction is obtained in the number of fermentation reactions, and more effective breakdown of the fats present in the sludges is obtained.

Where a dynamic thickener (centrifuge) is used, there will also be more effective liberation of the centrate by floatation, a reduction in the salts in the sludges, and consequently, here again, better possibilities for dewatering.

Lastly, where a digester is used (with use of anaerobic bacteria), the incidence of methane will be increased, and at the same time the residence time in the digester, and therefore the yield of the digester, will be increased.

Moreover, because of the reduction in the organic loads of the water obtained by the invention, there is a consequent reduction recorded in the COD of the centrates of the thickened sludges, with more effective capture of the fats and foams from the biological phase, and also a reduction in the concentration of salts and a better dewatering capacity.

With this objective, the invention proposes, in particular, a method for continuously purifying a flow of domestic or industrial waters, wherein the flow is subjected to treatment in a biological reactor by injecting an oxidizing gas into said flow and obtaining a first separation between the liquid part, which is discharged, and an organic sludge, which is decanted in the bottom part of the reactor or of an adjacent separator/settler, such that said sludge comprises between 4 and 12 g/l of Dry Matter (DM), characterized in that said sludge is used to supply a second chamber in continuous flow at a rate q, via a first chamber directly and/or through a first restriction, by air being injected into said second chamber at a rate $Q \geq q$, to give an emulsion, a predetermined pressure drop is created in the emulsion by a second restriction of supplying of a third chamber, a flocculant is injected into said third chamber, said emulsion is degassed, the emulsion thus degassed is recovered in a recovery tank, the flocculated and aerated sludge of said emulsion then floating in the top part of the tank, such that the liquid centrate which remains has a Dry Matter load of less than 100 mg/l and has a positive redox potential of at least 50 mV which is increased by a value of at least 100 my relative to that of the sludge entering the first chamber, after which said flocculated sludge is continuously or semicontinuously discharged, and the centrate is reinjected upstream of or into the biological reactor.

In other words, the invention provides in particular a method for continuous purification of a flow of domestic or industrial waters, wherein the flow is subjected to treatment in a biological reactor by injecting an oxidizing gas into said flow and obtaining a first separation between the liquid part, which is discharged, and an organic sludge, which is decanted in the bottom part of the reactor or of an adjacent separator/settler, such that said sludge comprises between 4 and 12 g/l of Dry Matter (DM), characterized in that said sludge is used to supply a chamber termed second chamber, in a continuous flow at a rate q, via a first restriction directly, or through a chamber termed the first chamber, said second chamber following said first chamber, with injection of air into said second chamber at a rate $Q \geq q$, to give an emulsion, a predetermined pressure loss is created in the emulsion by a second restriction of supply of a subsequent chamber termed third chamber, a flocculant is injected into said third chamber, said emulsion is degassed, the emulsion thus degassed is recovered in a recovery tank, in such a way that the flocculated and aerated sludge of said emulsion then floats in the top part of the tank, such that the liquid centrate which remains has a Dry Matter load of less than 100 mg/l and has a positive redox potential of at least 50 mV which is increased by a value of at least 100 mV relative to that of the first sludge entering the first chamber, after which said flocculated sludge is continuously or semicontinuously discharged, and the centrate is reinjected upstream of or into the biological reactor.

By "centrate" is meant the waters separated from the resulting sludges following biological treatment and the thickening system formed by the three chambers.

The my values are those read off on redox apparatuses of conventional type with a platinum ring electrode and an Ag/AgCl reference electrode (for example, a Hach Lange apparatus sold under reference E31M003).

It should be noted that the oxidation/reduction potential, or redox potential, is an empirical quantity which is expressed in volts (with symbol V) and written E° (Mn+/M) where (M) is any metal. This potential is expressed relative to a difference, often measured by a standard hydrogen electrode (SHE). This measurement, applied to redox couples for predicting the reactivity of chemical species with one another, is in the present case measured with the apparatus referenced E31M003 from Hach Lange as indicated above.

By convention, the standard potential E° is measured relative to the proton/hydrogen couple ($H^+/H_2$), with zero potential, which is not the case for the values expressed in the present text.

As an indication, and if it were appropriate to reference this standard definition, +100 mV would become +300 mV.

By thus introducing a centrate upstream of the biological reactor, the yield (% of VM or level of organic matter, conversion to mineral matter) of the station is enhanced by more than 5% up to 20%, said station therefore much more easily mineralizing the sludges, which will settle more effectively and make the water of better quality.

Similarly, with the invention, it is found that the filamentous bacteria are less numerous, thereby making the sludge easier to dewater.

With the invention, lastly, acceptable residence times are found, and there is no untimely rejection of sludges into the environment because of overflow of a saturated station, something which happens regularly in the existing stations.

In advantageous embodiments, use is made, otherwise and/or additionally, of one and/or another of the following arrangements:

the dry matter concentration of the flocculated sludge is regulated by discharging said flocculated sludge at a greater or lesser speed (without detriment to the quality of the centrate in terms of matter in suspension). Advantageously, in so doing, the levels of redox potential and of MES (Matter in Suspension) generated in the (undegraded) centrate are kept constant;

beforehand, the domestic or industrial waters are treated in a primary settling zone upstream of the biological reactor, in order to separate physically the decantable suspended matter elements with a size greater than a predetermined equivalent diameter of more than 0.01 mm from the remainder of the waters;

the centrate is reinjected into a septic part of the primary settling zone;

the flocculated sludge is transferred into and treated in a digester reactor which is supplied with anaerobic bacteria and is situated downstream of the recovery tank, and the methane (CH4) given off as result of said digestion is recovered for energy use and/or storage;

the process comprises a step of supplementary thickening of the flocculated and aerated sludges;

the first chamber is at a first pressure of between 0.2 and 6 bar relative, the flow rate q being between 5 m3/h and 100 m3/h, the second chamber is at a second pressure of between 0.1 bar and 4 bar relative, the air flow rate Q being between 5 Sm3/h and 1000 Sm3/h, and the third chamber is at a third pressure of between 0.05 bar and 2 bar relative.

In the present text, the $Sm^3$ (standard $m^3$) is defined according to the international standards in force, meaning that it is the $m^3$ of gas measured under standard conditions of temperature and pressure. In the present case, for example, the standard DIN 1343 is adopted, meaning that the conditions correspond to a temperature of 273.15° K (0° C.) and a pressure of 1 atm or 101 325 Pa;

an intermediate chamber between the second and third chambers is supplied;

air is injected a second time downstream of the first injection, into an intermediate chamber situated between the second and third chambers;

the first and second restrictions are formed by venturis;

the second chamber is a column having an average diameter d and a height H≥10 d;

the flocculant is a polymer which is injected immediately at the outlet of the second or third restriction.

The invention likewise provides a device implementing the method described above.

The invention therefore relates to a device for continuous purification of a flow of domestic or industrial waters, comprising a biological reactor for flow treatment, with injection of an oxidizing gas into said flow and obtention of a first separation between the liquid part, which is discharged, and an organic sludge, which is decanted in the bottom part of the reactor or of an adjacent separator/settler, so that said sludge comprises between 4 and 12 g/l of Dry Matter (DM), characterized in that the device comprises means for supplying a second chamber with said sludge in continuous flow at a rate q, via a first chamber and/or directly through a first restriction, said first and/or second chambers, means for injecting air into said second chamber at a rate Q≥q, to give an emulsion, means for creation of a predetermined loss of pressure in the emulsion via a second restriction in order to supply a third chamber, said third chamber, means for injecting a flocculant into said third chamber, means of degassing said emulsion, a tank for recovery of the emulsion thus degassed, means for recovering the flocculated and aerated sludge from said emulsion in the upper part of the tank, means for recovering the liquid centrate remaining, loaded with dry matter at a level of less than 100 mg/l, and having a positive redox potential of greater than 50 mV, which is increased by at least 100 mV relative to that of the sludge entering the first chamber, means for continuously or semicontinuously evacuating said flocculated sludge, and means for reinjecting the centrate into or upstream of the biological reactor.

In other words, it also relates to a device for continuous purification of a flow of domestic or industrial waters, comprising a biological reactor for flow treatment, with injection of an oxidizing gas into said flow, arranged for carrying out a first separation between the liquid part, which is discharged, and an organic sludge, means for decanting said sludge, in the bottom part of the reactor or of an adjacent separator/settler, said means being arranged so that said sludge comprises between 4 and 12 g/l of Dry Matter (DM), characterized in that the device further comprises means for supplying a chamber termed second chamber with said sludge in continuous flow at a rate q, via a first restriction, directly or in series with a chamber termed first chamber, said second chamber following said first chamber, said first and/or second chambers, means for injecting air into said second chamber at a rate Q≥q, to give an emulsion, a second restriction arranged to create a predetermined loss of pressure in the emulsion in order to supply a following chamber termed third chamber, said third chamber, means for injecting a flocculant into said third chamber, means of degassing said emulsion, a tank for recovery of the emulsion thus degassed, means for recovering the flocculated and aerated sludge from said emulsion in the upper part of the tank, means for recovering the liquid centrate remaining, arranged so as to obtain said liquid centrate loaded with dry matter at a level of less than 100 mg/l, and having a positive redox potential of at least 50 mV, which is increased by a value of at least 100 mV relative to that of the sludge entering the chambers, means for continuously or semicontinuously evacuating said flocculated sludge, and means for reinjecting the centrate into and/or upstream of the biological reactor.

The injection of the oxidizing gas into the flow takes place advantageously before sedimentation of a concentrated suspension of 4 to 12 g/l of dry matter (DM), composed essentially of bacterial residues, by leaving in overflow a liquid part, which is discharged, and that said organic suspension or sludge decanted in the bottom part of the reactor or of the adjacent separator-decanter, so that said suspension or sludge comprises between 4 g and 12 g/l.

Likewise advantageously, the device further comprises an intermediate chamber between the second and third chambers, and means for injecting air downstream of the first injection into said intermediate chamber.

In one advantageous embodiment, the first and second restrictions are formed by venturis.

Likewise advantageously, the second chamber is a column with a mean diameter d and a height H≥10 d.

A better understanding of the invention will be obtained on reading the description which follows of embodiments given hereinafter as nonlimiting examples. The description makes reference to the drawings which accompany it, in which.

Figure 1:
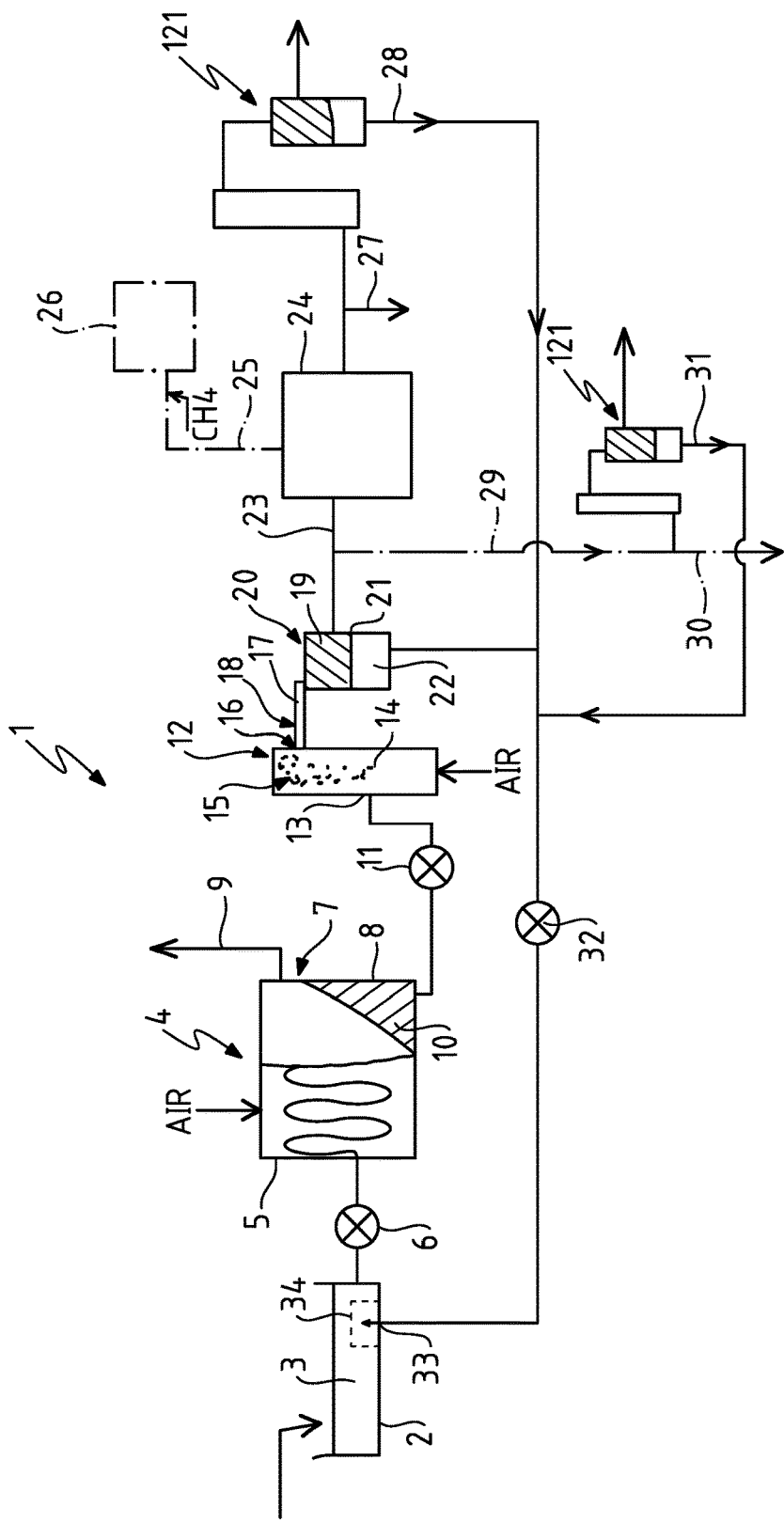
FIG. 1 is an operational diagram of a first embodiment of a device implementing the method according to the invention.

FIG. 1 shows a purification device 1 comprising a primary settler 2 (for example, a lagoon) of wastewater 3, a biological reactor 4 which is known per se and is equipped with a biological section 5 supplied via a pump 6 from the settler 2, and with a settler/clarifier section 7, equipped with a separating grille 8. The resulting water is discharged at 9 (for example, to a river), and the decanted sludge 10 is pumped at 11 toward the thickening system 12, which will also be described more particularly with reference to FIG. 2.

Figure 2:
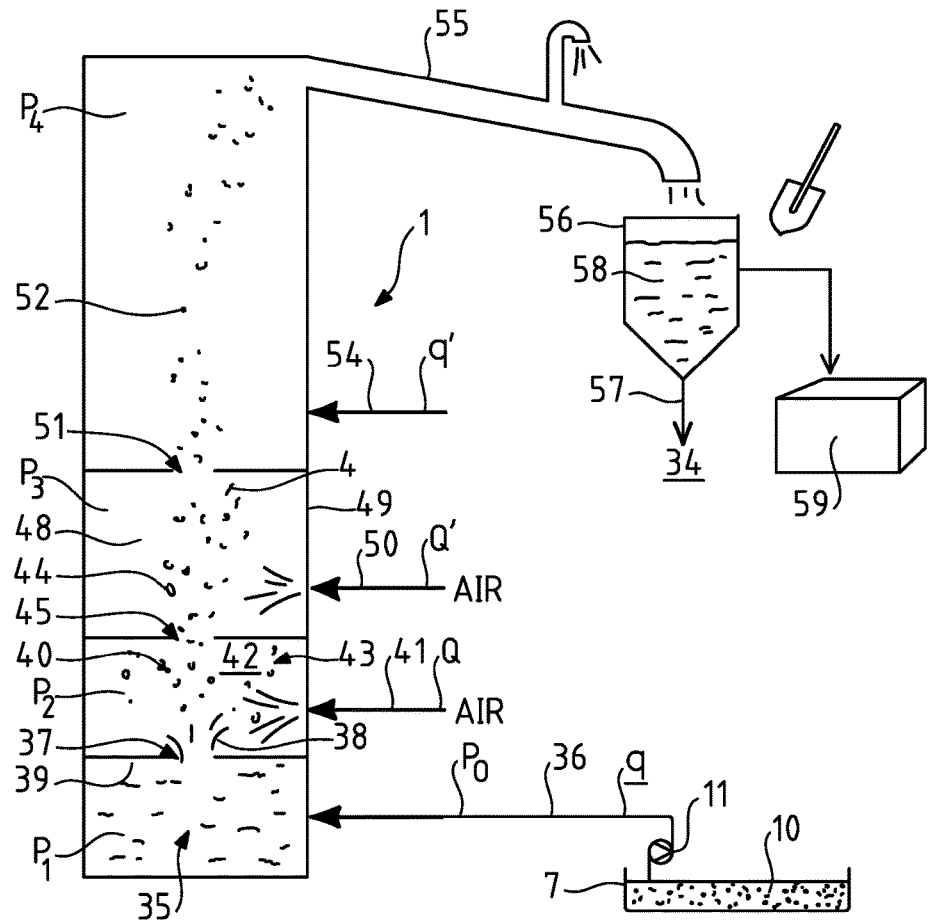
FIGS. 2 to 4 show, diagrammatically, embodiments of thickening systems which can be used with the invention.

The system 12 comprises a first restriction 13, a second chamber 14 which is supplied with air to form an emulsion 15, a second restriction 16, and a third chamber 17 in the form, for example, of a tube equipped with means 18 for injecting a flocculant, The emulsion thus flocculated and aerated, 19, is recovered at the top part 20, of a recovery tank 21, such that the liquid centrate 22 is loaded with dry matter at a level of less than 100 mg/l and has a redox potential of greater than 100 mV, A result of this kind is obtained through the succession of at least two restrictions, at least one air supply, and the appropriate injection of flocculant at the appropriate sites, at the same time advantageously observing the flow rate ratios which are also specified, for example, hereinafter, but without limitation, with reference to FIG. 2.

It should also be noted that simple adjustments within the scope of the person skilled in the art, taking account of the parameters associated with the waters treated, with the dimensions of the chambers, and with the amounts of air and flocculant injected, are employed in order to obtain such a result.

Next, at 23, the flocculated sludge is discharged continuously or semicontinuously (by scraping or regular emptying of the sludge accumulated at 20) in a reactor/digester 24 which is known per se and which is supplied with anaerobic bacteria. Recovery means (suction pump, for example) at 25 are provided, and the methane gas CH4 can be reused in order to provide electricity in a plant 26 which is known per se.

The sludge thus digested is recovered at 27 for irrigation and/or any other use. It may also be treated again by a thickening system 12' of the same type as the system 12, with the centrate being recovered at 28.

Likewise, the digester 24 may be absent, in which case the flocculated sludge is discharged at 29 either for another use (arrow 30) or to a system 12" of the same type as the systems 12 and 12', with centrate recovered at 31.

According to the invention, the centrates recovered downstream of the systems 12, 12' and/or 12" are reinjected via a pump 32 upstream of the biological reactor 4, advantageously at 33, into a septic zone 34 of the primary settler 2. It is then found that this reinjection significantly enhances the performance of the purification process.

By enhancement of performance is meant an increase in the residence time in the reactor, an increase in the oxidation potential (redox potential), and an improved mineralization, for identical waters to be treated.

FIG. 2 shows, more precisely, a system 12 for thickening liquid sludges 10 which are, for example, pumped by the pump 11 from the section 7 for storing sludges with high organic content, according to one embodiment of the invention.

The system 12 comprises a first chamber 35 with a small volume, which is cylindrical or cubic, for example, with a volume of 10 l, for example, for receiving the liquid sludge, at a first, predetermined pressure $P_1$, for example, which is slightly lower than the pressure $P_0$ at which the sludge exits the supply pump 11, owing to the pressure losses in the supply circuit 36 (a flexible tube, for example). The delivery q of the pump is, for example, between 5 m$^3$/h and 50 m$^3$/h, 10 m$^3$/h for example, and the first, predetermined pressure $P_1$ is 2 bar absolute, with $P_0$ being, for example, 2.2 bar absolute.

At its outlet, the chamber 35 comprises a restriction 37, formed, for example, by an orifice or nozzle 38, which is circular, with a diameter of 2 cm, for example, in an intermediate wall 39, which provides separation from a second chamber 40, which has a greater volume, of 200 l, for example.

The second chamber 40 is cylindrical, for example, and is at a second pressure $P_2$ (for example, 1.8 bar absolute) and is supplied for example in the bottom part with air 41 at a very high flow rate Q=500 Sm$^3$/h and at a pressure of several bar, 5 bar for example, so producing in the compartment 42 formed with the chamber an emulsion 43 of sludge droplets 44 which is discharged by way of a second restriction 45, which is similar to or identical to the restriction 37.

The injection of air into the emulsion just after the introduction of the sludge into the compartment facilitates the mixing which takes place in the accelerating section after the nozzle (air ejector effect).

The second restriction 45 opens out into an intermediate chamber 48, with a greater volume, for example, of 500 l, for example, which is formed by a cylinder 49 whose interior is at a third pressure $P_3$, of 1.6 bar absolute, for example.

A second injection of air 50 in the bottom part of this intermediate chamber further increases the partitioning or dilution of the sludge in the air, the injection taking place, for example, at a flow rate Q' of 200 Sm$^3$/h, where, for example, 50 Sm3/h<Q'≤Q.

In the embodiment described here, via a third restriction or nozzle 51, the intermediate chamber 48 itself supplies a third chamber 52, likewise cylindrical, with a height for example of 3 m, at a fourth pressure $P_4$, which decreases from the chamber inlet at 53, at 1.2 bar, down to atmospheric pressure at the top part.

The fourth chamber comprises a supply of flocculant 54 (for example, a known polymer) at a flow rate q', which is dependent, for example, on the type and the flow rate of sludge, and which can be assessed by the person skilled in the art in a manner known per se in order to obtain effective flocculation.

The sludges subsequently undergo discharge—gravity discharge, for example—via a vented tubing 55 into a filter bag 56; the purified water 57 is discharged toward the bottom, and the thickened sludge is itself recovered, by pelleting, for example, to form thickened blocks 59, the thickening being for example by a factor of 20 relative to the liquid sludge 2 at entry (τ of DM multiplied by 10, before draining into the filter bag).

According to the invention, the purified water or centrate 57 is returned to the start of treatment upstream of the biological reactor, in the septic zone 34, for example.

Figure 3:
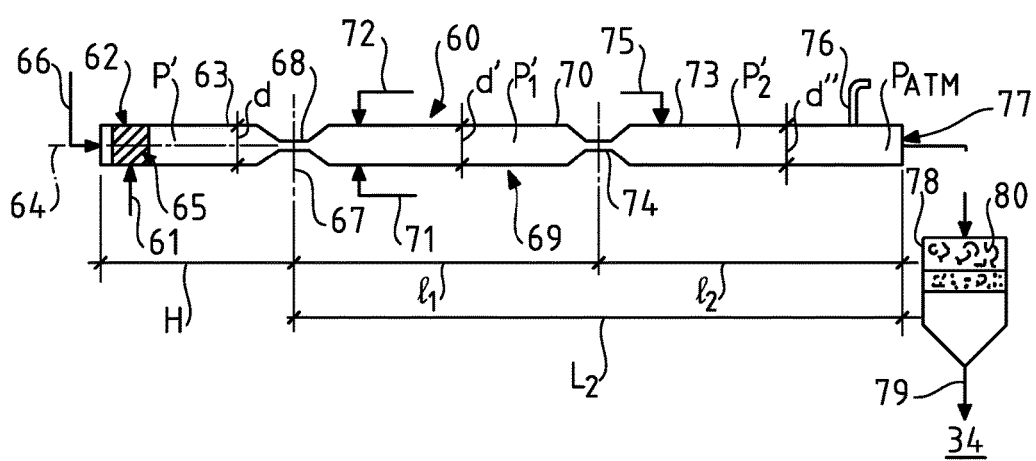

FIG. 3 shows another embodiment of a device 60 for thickening liquid sludges 61 which are introduced at an end portion 62 of a vessel 63 which is elongated about an axis 64 and has a predetermined height H of for example 1 m.

The vessel is maintained at an average pressure P' of 2 bar absolute, for example, and is formed by a cylinder with a diameter $\underline{d}$ of 150 mm, for example.

The sludge supplies a reduced zone 65, of 10 l, for example, which is situated at the end portion 62, which is also supplied, at the end of the vessel and upstream of the sludge introduction, by an air inlet 66, with a pressure P''>P', for example, of 2 bar absolute, for example.

The air is supplied at a very high flow rate Q' of 100 Sm$^3$/h, for example, with the sludge itself being introduced at a flow rate Q of 10 m$^3$/h, for example.

The sludge 61 fragments in the air, which is at high pressure, since a slight underpressure ΔP exists between the vessel at the entry of the sludge at 65 and the exit of the sludge emulsion downstream 67 of the vessel.

At the outlet of the vessel 63 there is a venturi 68 and/or a control valve which generates a pressure loss, for example, of 0.4 bar; the sludge emulsion here is discharged into a tubular chamber 69 comprising a first, cylindrical part 70 with a diameter d' (for example, d'=$\underline{d}$), which is at a pressure P'$_1$<P', here for example of 1.6 bar (in the example taken), and a reagent, at 71, and/or, again air (connection 72) can be injected into said part 70, downstream of the venturi, and close to said venturi (at the distance, for example, of 10 cm, in order to allow effective agitation).

In this embodiment, the tubular chamber also comprises a second cylindrical part 73, which is separated from the first part 70 by a second venturi 74, said second part having a diameter d" where, for example, d'=d"=d.

Downstream of the venturi 74, and close to it (at 1 to 10 cm), a flocculant supply 75 is provided, with means which are known per se (metering pump, etc.), and with a vent 76 for exposure to the atmosphere and/or a sludge outlet 77 which is open to the atmosphere, the pressure P'$_2$ in this second part therefore being brought very rapidly to atmospheric pressure, from 1.3 bar, for example, at the outlet of the venturi, before moving rapidly to 1 bar=1 atmosphere at the outlet 77; following the addition of the flocculant, the emulsion becomes an emulsion of air in the sludge flakes, which flow under gravity at the end.

The total length of the chamber $L_2 \approx l_1 + l_2$ is, for example, 10 m, where $l_1$=3 m and $l_2$=7 m, although other values are possible, with the proportion between $l_1$ and $l_2$ being generally—but nonlimitatively—such that $l_1 < l_2$.

The device 70 further comprises a filter 78 and/or a settling tank for discharge of the purified water 79 at the bottom part toward the zone 34 upstream of or in the biological reactor, and discharge of the dewatered sludge 80 at the top part.

Figure 4:
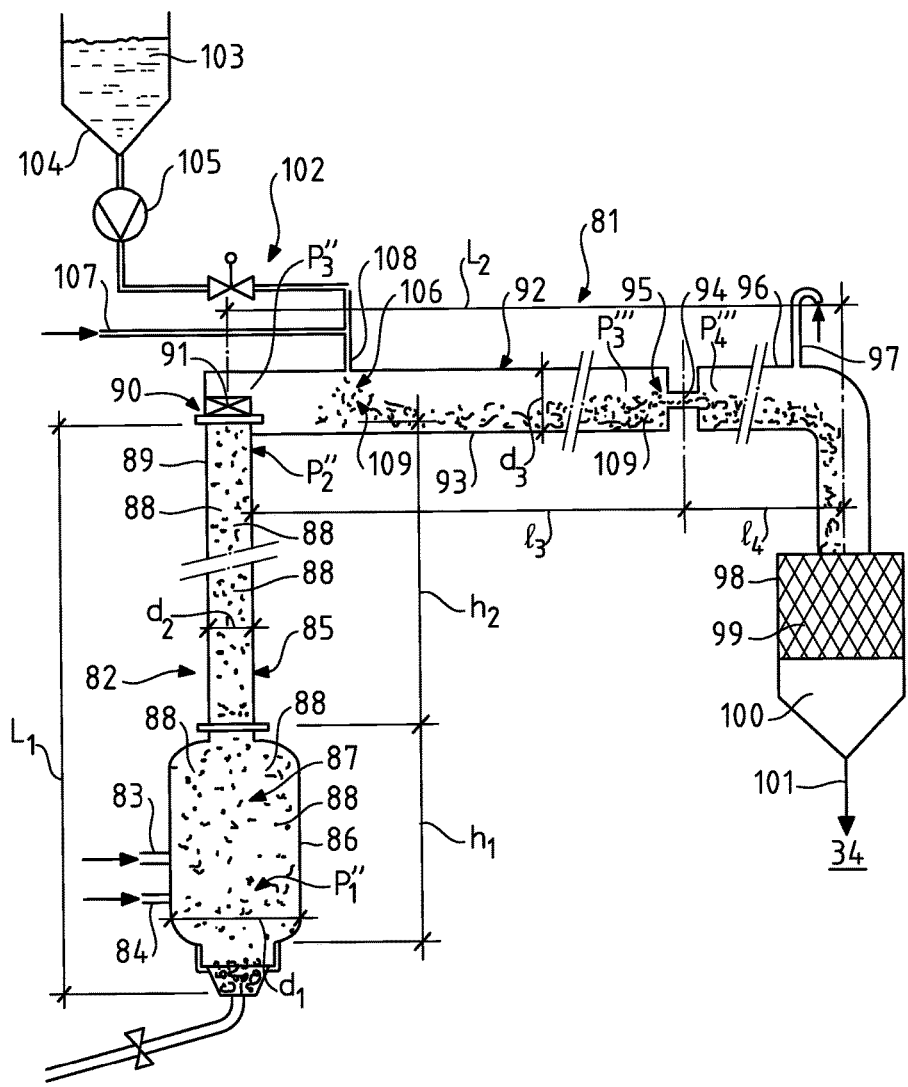

FIG. 4 shows a third embodiment a system 81 according to the invention.

The system 81 comprises a vessel 82 which is supplied, via a connection 83 in the bottom part, with liquid sludge, and, below this connection 83, with compressed air at a high flow rate via a second connection 84.

More specifically, the vessel is formed by a vertical column 85, comprising a first part forming a reservoir for very intensively mixing/agitating the air and the sludge, this part having small dimensions, being—for example—cylindrical with a height $h_1$=50 cm and a diameter $\underline{d_1}$ of 30 cm, giving a volume of the order of 35 l, and so allowing the first emulsion 87 of droplets 88 of broken sludge to be obtained.

This emulsion of drops in a strong upward stream of pressurized air next enters into a cylindrical pipe 89, which extends the reservoir 86, and has a smaller diameter $d_2 < d_1$, of 10 cm diameter for example, and which extends over length $\underline{h_2}$ of 1 m, for example (with $L_1 = h_1 + h_2$).

In this air column, the gas stream carries out stripping of the gases which are present and/or which result from the sludges, and particularly of ammonia NH3, so producing, in a way which is surprising and is dependent on the operating conditions and the organic sludges treated, virtually complete removal of the undesirable gases (<a few ppm) trapped in the sludges.

The length $l_2$ is advantageously proportioned for this to be accomplished by the person skilled in the art.

At the top 90 of the chamber, a control valve 91 and/or a non-control valve is provided, for discharging to a tubular chamber 92.

The pressure of the emulsion 87 changes from $P_1''$ (for example, 3 bar) in the initial reservoir 86 to $P_2''$ (2.890 bar), slightly less than $P_1$, in the top part of the column 89 of the vessel, at the level of the valve 91, with $\Delta P''=P_2''-P_1''$=a few millibar, and then, at the outlet of the valve, to $P_3''$=2 bar (owing to the pressure drop of the valve).

More specifically, the chamber 92 comprises a first section 93 with a length $l_3$ of 5 m, for example, which terminates in a venturi 94 that causes the pressure $P_3'''<P_3''$ at the end 95 of the first section to change to a pressure $P_4''$ in a second section 96 of the chamber as a granitary gradient, equipped with a vent 97, the section 96 having a length $l_4$ of, for example, 1 m, where $L_2=l_3+l_4$.

The section 96 is connected to the filter 98 for separating suspended matter 99 from the liquid part 100, which is emptied continuously at 101, for reinjection into the zone 34.

The chamber comprises means 102 for supplying flocculant 103 from a reservoir 104 for preparing by agitation and mixing. A metering pump 105 introduces the flocculant into the sludge emulsion emerging from the vessel 82 at the outlet of the valve 91, or in the immediate proximity (i.e., a few cm), in a zone 106 which is fairly disturbed as a result of the pressure drop generated by said valve 91. Here, and for example, $P_3''$ has changed from $P_2'' \approx 2$ bar to $P_3''=1.4$ bar, with $P_4''$ being itself at atmospheric pressure or substantially at atmospheric pressure as a result of the vent 97.

In this embodiment, provision has also been made for an input of additional air 107, which is injected, for example, with the flocculant via the connection 108, or in parallel.

The emulsion 109 at the exit of the treatment with the flocculant becomes an emulsion of air in the thickened flocculated sludge.

The two sections 93 and 96 are, for example, cylindrical with the same diameter $d_3$, equal for example to the average diameter of the vessel, for example $$\frac{d_1 + d_2}{2}.$$

For 10 m³/h of liquid sludge, with an airstream of 60 Sm³/h minimum, irrespective of the mode of injection, and with the vessel having a cross section of 200 mm for a height of 5 m, 10 m, 30 m or more, a stripping effect is observed (stripping of trapped gases) which is very strong, the air being intimately mixed with the sludge.

With regard to the flocculant, preference will be given to using a polymer, a cationic polymer for example.

As an example, for a sludge containing 7 g/l of DM, 50 g of crude polymer are used, prepared for example at 5 g/l, i.e., an injection of 10 l of solution per m³ of sludge. Injection is carried out on immediate exit from the column of the vessel.

As a variant, it is possible to add a reagent which improves the impacts between the sludge particles. It can be used, for example, at a level of 10%, 5% or 1% of the DM content of the sludges, as seen before.

This reagent is, for example, sand, calcium carbonate or slaked lime, etc. It is introduced upstream of the column, for example within a vat for mixing with the liquid sludge (not shown).

Oxidation reagents may also be provided.

In certain applications, as for example when the sludges contain large amounts of organic fatty acids, or when these sludges are sludges resulting from a biogas plant, indeed, excellent results are observed.

For example, in proportions of 1 l of H2O2 or 1 l of S2o8 per m³ of sludge containing 40 g/l of DM.

It is also possible to provide a reagent which helps in the coagulation of the additional organic matter.

For example, for a sludge with 11 g/l of DM and 8% of VM (Volatile Matter, i.e., organic matter/dry matter) (approximately organic matter/dry matter (?)) and for 500 ml of sludge, 1 ml of FeCl3 (10% solution) is provided, either with the introduction of the liquid into the column, or before the introduction of flocculant (after the column).

By way of example, tests were carried out on biological sludge with a belt filter, starting from sludges with a DM load of 26 to 30 g/l, with:
Q'=50 to 80 Sm3/h
P=1.7 bar of pressure of the vessel/reactor
Q=3 to 15 m3/h On exit from the process, sludges are obtained which have a porous appearance and are dry, with accelerated drying and a dryness of 25% to 35%.

Observed accordingly, surprisingly and by simple decanting, the water allows its unbonded water to be discharged directly under gravity and with a high redox potential>100 mV.

The sludge then dries gradually, going from 100 g/l of DM after the $1^{st}$ hour to 130 g/l after 2 h, 160 g/l after 5 h, and 350 g/l after 1 month. (big bag).

Other examples of treatment according to the method employed, by recovery on a sludge bin or filter bags (also referred to as big bags), give:
Sludge bin; Ex. 2: 130 g/l after 20 h and 180 g/l after 8 d
Sludge bin; Ex. 3: 100 g/l after 5 h, 130 g/l after 7 d.
Big bag; Ex. 4: 100 g/l after 24 h, 115 g/l after 7 d, and 221 g/l after 1 month.
Big bag; Ex. 5: 144 g/l after 24 h, 154 g/l after 7 d, and 459 g/l after 1 month.
Big bag; Ex. 4: 120 g/l after 24 h (while it rained all night) and 402 g/l after 1 month.

It should be noted that the sludge treated with the invention is liquid to start with downstream of the biological reactor and arranged so as to exhibit, after passing through the reactor, a DM concentration of 4 to 12 g/l.

Up to 12 g/l, dilution is not a priori a requirement. If the sludge is very dense, for example beyond 40 g/l, dilution can be carried out upstream of the reactor, at the inlet, in order to allow effective operation of sludge pumping, with the sludge, it should be remembered, being an organic sludge, in other words a sludge for which the OM (Organic Matter) content as a proportion of the DM (Suspended Matter) content is between 65% and 85%. Organic Matter is understood to mean, essentially, phospholipids, polysaccharides, proteins, alkali metals, alkaline earth metals and/or metals, etc.

Another operating example has been given below, this time with reference to simplified FIG. 3 (the first chamber portion is omitted).

The vessel 63 forms a first compartment in the form of a pipe with a diameter of 20 cm and a length of 50 cm, into which an organic sludge (obtained from the clarifier of the biological reactor of a municipal purification plant, for example) comprising 6 g/l of DM is introduced at a flow rate Q=10 m3/h, and compressed air at 50 Sm3/h of air at 1.9 bar is introduced by means of a blower.

A 5 cm2 orifice closes this compartment over a length of 10 cm.

Immediately downstream of this orifice, a flocculant, proportioned for example at 10 g/l, is introduced into the chamber 63.

The post-orifice pressure gradually falls, to arrive at atmosphere after several meters.

For example: the chamber 63, which forms a post-orifice compartment, is also a pipe with a length of 3 m and a diameter of 20 cm.

At the end of the chamber, all of the streams join, for example, a filter pocket (filter 80) with a cutoff threshold of 500 µm, immediately giving rise to a dryness of 10% (or 100 g/l) and a clear filtrate at 79 with 50 mg of oxygen (O2) per liter (COD).

The reagents are introduced in liquid form via metering pumps. Conventionally, the more concentrated the sludges, the more dilute the reagents must be prepared. Exit from the device takes place at atmosphere. However, subjection to the atmosphere may possibly be regulated, in one embodiment of the invention, so that the pressure of the downstream separation appliance is recovered.

At the outlet the sludges may of course be used in irrigation on the soil, with or without composting, alone or with green or other waste.

The sludges may also be dried on simple or solar drying beds.

The centrate itself is returned at the top as indicated above in the invention.

It is found that, strangely, the resulting sludges are "non-odorous" and do not ferment over time (anaerobic fermentation).

In fact, the effective dilution with air gives the sludges a high dewatering power, owing to the presence of air bubbles.

By virtue of an optimized sludge concentration as obtained with the invention, this concentration will very favorably maximize the dewatering function, producing an unbonded water of high resistivity, by virtue of the method described above, thereby allowing a better yield to be obtained when it is reinjected upstream.

As indicated above, the device and the method described enable improvement in the yield of a purification station, by producing sludges which are easier to dewater, being for example more concentrated, by 30 g/l of DM, for a given thickening or dewatering appliance.

With the invention, indeed, it is found that:

By virtue of the low recirculating DM load and of the aid to oxidation obtained because of the increase in the redox or in the O2 saturation of the water extracted from the sludges, there is a decrease in the average load of the biological treatment lagoons.

This then makes it possible to increase the time of presence within these lagoons for a set DM concentration, and, consequently, to enhance the process of mineralization of the sludges and therefore their capacity to settle out or to be dewatered (it is the organic colloids which trap the water within highly hydrated flocs).

It is then possible to prevent the phenomena of escape of sludge in the overflow waters of the clarifier lagoons.

In the same way, the provision of positive redox is greater than 100 mV.

It should be noted that the conventional sludges which have emerged from clarification generally have a redox of −50 mV approximately.

With the invention, therefore, a difference of more than 100 mV, or even more than 150 mV, is observed.

It is noted, moreover, that the provision of centrate with a redox of this type in the septic zones of the station enables prevention and/or considerable inhibition of the proliferation of filamentous bacteria.

It is these bacteria which are detrimental to the effective decanting of the sludges into the clarifying lagoons, but also into the settling lagoons which are often also used to thicken the sludges before dewatering or digestion.

When, moreover, the biological sludge passes via a digestion step, an increase is then observed in the dewatering, leading to a drier sludge entering the digester and therefore to a lower hydraulic flow rate and, consequently, an increased residence time.

Consequently there is greater production of biogas (CH4) and increased mineralization of the sludges, again facilitating the extraction of the water under good conditions, and hence a better centrate (MES) on return at the top, and also an enhanced dryness, which directly lowers, again, the operating charges associated with the disposal of the sludges.

Lastly, the high porosity of the sludges obtained with the invention gives them a very low viscosity, which ensures excellent mixing in the digester and therefore temperature homogeneity and a decrease in the electrical consumption associated with mixing within the digesters. These elements thus allow the yield of the treatment unit assembly to be increased.

It has also been possible to observe that the porosity of the sludges is such that the ascension velocity in water is greater than or equal to 25 m/h.

Furthermore, an increase in the dryness of 30 g/l has an impact on the residence time of 15% in a downstream digester, thus giving more time for producing CH4 from the organic substances and for mineralizing them.

By way of nonlimiting example, the results obtained with the method according to the invention have been reproduced below (table I).

This table illustrates the immediate effect of the treatment apparatus with return at the head as described with reference to FIGS. 1 and 2. It is seen that the redox potential of the centrate at the outlet is always greater than 50 mV, and that the difference between the entry and the outlet is always greater than +100 my.

TABLE 1

| | Entry | | Thickened | Centrate |
|---|---|---|---|---|
| Date | E mV | DM entry g/L | DM exit g/L | E mV |
| Dec. 24, 2014 | −85.00 | 5.29 | 70.23 | 113.50 |
| Jan. 2, 2015 | −119.60 | 6.13 | 66.39 | 74.40 |
| Jan. 7, 2015 | −88.40 | 5.06 | 71.37 | 94.40 |
| Jan. 7, 2015 | −79.60 | 5.16 | 67.79 | 93.80 |
| Jan. 14, 2015 | −48.80 | 6.02 | 64.69 | 103.20 |
| Jan. 15, 2015 | −103.30 | 5.70 | 56.00 | 82.30 |
| Jan. 28, 2015 | −108.00 | 5.32 | 75.40 | 92.70 |
| Jan. 28, 2015 | −15.40 | 6.20 | 68.72 | 103.00 |

Figure 5:
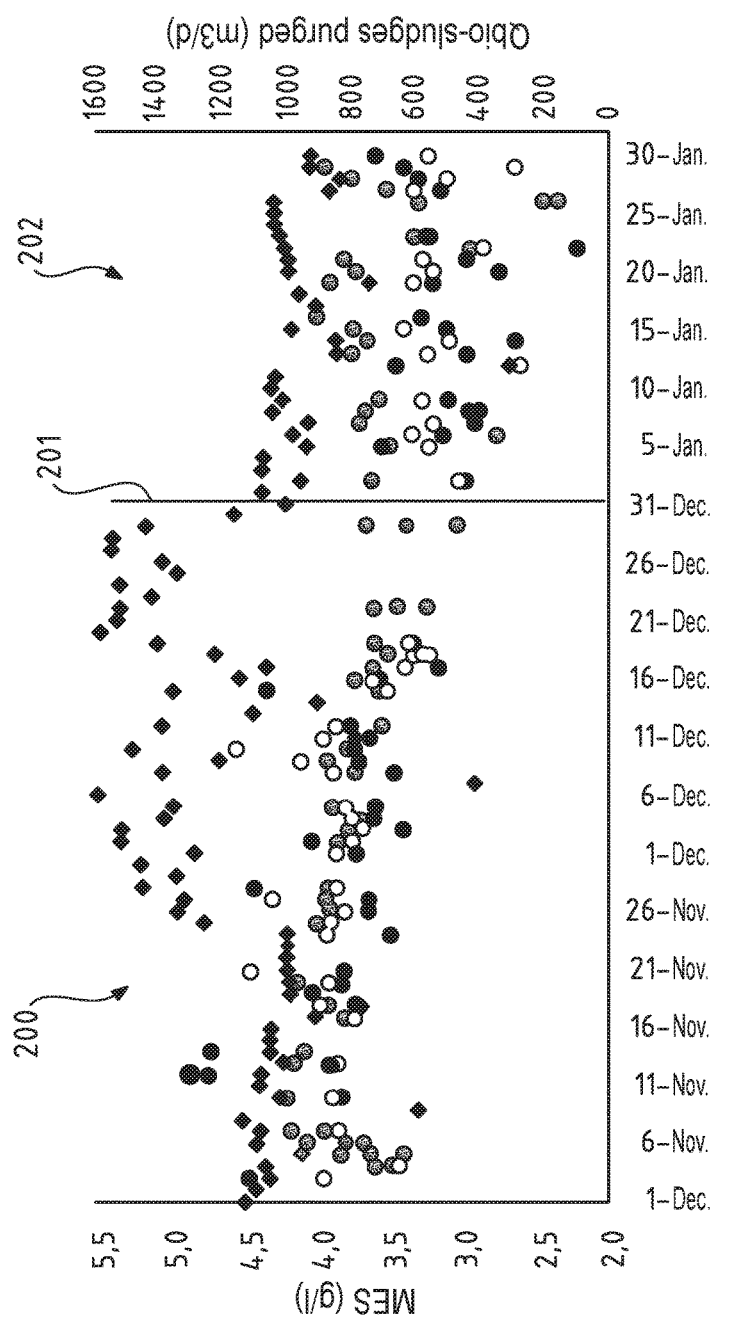
FIG. 5 is a graph showing the flow rates of sludges purged from the separator/settler of a biological reactor without the invention, and with the invention.

FIG. 5 illustrates the influence of the invention on the lagoon load (separator/settler) of a biological reactor in an existing, conventional purification plant for domestic waters.

The circles represent the sludge loads or sludge concentration of the lagoons (weight of DM/volume), or MES, in which the values (in g/l) are given on the ordinate, in the left-hand part of the graph, and that for the days is given on the abscissa.

The diamonds represent the flow rates of daily sludge discharge (removal), for which the values are given on the ordinate in $m^3/d$, in the right-hand part of the graph.

This graph is divided into two zones.

A first zone 200, without implementation of the invention, is separated (vertical line 201) from a second zone 202, with implementation of the invention (plant of the type described with reference to FIGS. 1 and 2).

It is noted (see zone 202) that by virtue of the invention, a load of less than 4 g/l is maintained, while purging takes place at regular flow rates of in general less than 1100 $m^3/d$.

Conversely, (see zone 200), the loads are regularly above 4 g/l with, visibly, peaks of around 5 g/l, and therefore with risks of sludge discharge into the environment, and the purge or discharge flow rate is, so to speak, systematically above 1200 $m^3/d$ and on average essentially above 1400 $m^3/d$ or even 1600 $m^3/d$.

This graph therefore illustrates that with the invention, a significant drop is observed in the load in the lagoons, and therefore a substantial drop in the need for sludge purge by the operator.

The operator, indeed, is required to carry out purging in order not to have too high a sludge curtain, and risks of egress of sludge into the water which leaves the station.

Turning to table II, the significant increase in the digestion yield with the invention is illustrated (where the station includes such a digester).

In the table, indeed, it is noted that there is more inertia and, in particular, that 100% of the sludge produced over 1 month has gone into the digester. Moreover, there is a significant reduction in VFA (Volatile Fatty Acids), thereby likewise demonstrating the improved yield of the station. These acids, indeed, are reaction intermediates, and the drop in their level shows that the digestion is more complete.

They are also acids which acidify the medium and block part of the process of digestion.

Their reduced level is therefore a significant indicator of the improvement obtained with the invention.

TABLE II

| Date | VFA g/l | Yield % VM |
|---|---|---|
| Sep. 1, 2014 | 0.32 | 48.97 |
| Sep. 2, 2014 | 0.33 | 42.19 |
| Sep. 3, 2014 | 0.29 | 45.32 |
| Sep. 12, 2014 | 0.28 | 49.02 |
| Sep. 13, 2014 | 0.29 | 51.69 |
| Sep. 14, 2014 | 0.29 | 54.04 |
| Sep. 28, 2014 | 0.30 | 53.31 |
| Sep. 29, 2014 | 0.30 | 51.53 |
| Sep. 30, 2014 | 0.32 | 55.72 |
| Oct. 14, 2014 | 0.36 | 50.58 |
| Oct. 15, 2014 | 0.35 | 52.67 |
| Oct. 16, 2014 | 0.34 | 48.54 |
| Dec. 20, 2014 | 0.31 | 52.28 |
| Dec. 21, 2014 | 0.30 | 52.43 |
| Dec. 22, 2014 | 0.30 | 53.42 |
| Jan. 5, 2015 | 0.28 | 59.33 |
| Jan. 6, 2015 | 0.26 | 53.93 |
| Jan. 7, 2015 | 0.27 | 57.07 |
| Jan. 16, 2015 | 0.26 | 51.89 |
| Jan. 17, 2015 | 0.26 | 57.38 |
| Jan. 18, 2015 | 0.26 | 55.50 |
| Jan. 19, 2015 | 0.26 | 59.01 |
| Jan. 20, 2015 | 0.26 | 60.07 |
| Jan. 21, 2015 | 0.26 | 63.66 |
| Jan. 22, 2015 | 0.26 | 64.67 |
| Jan. 23, 2015 | 0.26 | 64.03 |
| Jan. 24, 2015 | 0.26 | 64.06 |
| Jan. 25, 2015 | 0 26 | 64.79 |
| Jan. 26, 2015 | 0.26 | 63.29 |
| Jan. 27, 2015 | 0.26 | 59.47 |
| Jan. 28, 2015 | 0.26 | 57.81 |
| Feb. 9, 2015 | 0.23 | 58.65 |
| Feb. 10, 2015 | 0.23 | 56.46 |
| Feb. 11, 2015 | 0.22 | 60.66 |
| Feb. 21, 2015 | 0.2 | 59.77 |
| Feb. 22, 2015 | 0.2 | 61.69 |
| Feb. 23, 2015 | 0.2 | 59.13 |
| Mar. 17, 2015 | 0.19 | 62.22 |
| Mar. 18, 2015 | 0.18 | 55.51 |
| Mar. 19, 2015 | 0.18 | 61.06 |

As is self-evident, and as is also a result of what has been said above, the present invention is not limited to the embodiments more particularly described. On the contrary, it encompasses all of the variants thereof, and especially those in which the number of chamber sections and/or portions is different, being for example greater than three, or else in which the vessel is horizontal with a single section.

The invention claimed is:

1. A method for continuously purifying a flow of domestic or industrial waters, wherein the flow is subjected to treatment in a biological reactor by injecting an oxidizing gas into said flow and obtaining a first separation between the liquid part, which is discharged, and an organic entering sludge, which is decanted in the bottom part of the reactor or, after transfer to a separator/settler adjacent to said reactor, in the bottom of said separator/settler, such that said entering sludge comprises between 4 and 12 g/l of Dry Matter (DM), wherein said entering sludge is used to supply a second chamber following said reactor or said separator/settler, in continuous flow at a rate q, via a first restriction directly or through a first chamber while injecting air into said second chamber at a rate Q≥q, to give an emulsion, a predetermined pressure drop is created in the emulsion by a second restriction of supplying of a subsequent third chamber, a flocculant is injected into said third chamber to create a flocculated emulsion, said flocculated emulsion is degassed, said flocculated emulsion thus degassed is recovered in a recovery tank, in such a way that the flocculated and aerated sludge of said flocculated emulsion then floats in the top part of the tank, such that a liquid centrate of said flocculated emulsion, which remains, has a Dry Matter load of less than 100 mg/l and has a positive redox potential of at least 50 mV which is increased by a value of at least 100 mV relative to that of the entering sludge, after which said flocculated aerated sludge is continuously or semicontinuously discharged, and the centrate is reinjected upstream of the biological reactor or into the biological reactor.

2. The method as claimed in claim 1, wherein the dry matter concentration of the flocculated sludge is regulated by discharging of said flocculated and aerated sludge at a greater or lesser speed.

3. The method as claimed in claim 1, wherein the domestic or industrial waters are treated beforehand in a primary settling zone upstream of the biological reactor, for physical separation of the suspended matter elements with a size greater than a predetermined equivalent diameter of more than 0.01 mm from the remainder of the waters.

4. The method as claimed in claim 3, wherein the centrate is reinjected into a septic part of the primary settling zone.

5. The method as claimed in claim 1, wherein the flocculated sludge is transferred to and treated in a digester reactor which is supplied with anaerobic bacteria and is situated downstream of the recovery tank, and the ammonia gas given off as a result of said digestion is recovered for energy use and/or storage.

6. The method as claimed in claim 1, wherein it comprises a step of supplementary thickening of the flocculated and aerated sludges before reinjection upstream of the biological reactor or into the biological reactor.

7. The method as claimed in claim 1, wherein the first chamber is at a first pressure of between 0.2 and 6 bar relative, in that the rate q is between 5 m$^3$/h and 50 m$^3$/h, in that the second chamber is at a second pressure of between 0.1 bar and 4 bar relative, the rate of air Q being between 50 Sm$^3$/h and 1000 Sm$^3$/h, and in that the third chamber is a third pressure of between 0.05 bar and 2 bar relative.

8. The method as claimed in claim 1, wherein an intermediate chamber between the second and third chambers is supplied, involving an additional step of pressure drop in the emulsion.

9. The method as claimed in claim 1, wherein air is injected a second time downstream of the first injection into an intermediate chamber situated between the second and third chambers.

10. The method as claimed in claim 1, wherein the first and second restrictions is each a venturi restriction.

11. The method as claimed in claim 1, wherein the second chamber is a column with a mean diameter d and a height $H \geq 10\,d$.

12. The method as claimed in claim 1, wherein the flocculant is a polymer which is injected immediately at the outlet of the second restriction, or wherein a fourth chamber following said third chamber via a third restriction, said flocculant is injected immediately at the outlet of said third restriction to create said flocculant emulsion to be degassed.

13. A device for continuous purification of a flow of domestic or industrial waters, comprising
- a biological reactor for flow treatment, with injection of an oxidizing gas into said flow, arranged for carrying out a first separation between the liquid part, which is discharged, and an organic sludge,
- means for decanting said sludge, in the bottom part of the reactor or of following adjacent separator/settler, said means being arranged so that said sludge comprises between 4 and 12 g/l of Dry Matter (DM),
- wherein the device further comprises
- means for supplying a second chamber following said reactor or said separator/settler, with said sludge in continuous flow at a rate q, via a first restriction, directly or in series with a first chamber, said second chamber following said first chamber,
- said first and/or second chambers,
- means for injecting air into said second chamber at a rate $Q \geq q$, to give an emulsion,
- a second restriction arranged to create a predetermined loss of pressure in the emulsion in order to supply a following third chamber,
- said third chamber,
- means for injecting a flocculant into said third chamber, to obtain a flocculated emulsion,
- means of degassing said flocculated emulsion,
- a tank for recovery of the flocculated emulsion thus degassed,
- means for recovering a flocculated and aerated sludge from said flocculated emulsion in the upper part of the tank,
- means for recovering a liquid centrate of said flocculated emulsion remaining, arranged so as to obtain said liquid centrate loaded with dry matter at a level of less than 100 mg/l, and having a positive redox potential of at least 50 mV, which is increased by a value of at least 100 mV relative to that of the entering sludge,
- means for continuously or semicontinuously evacuating said flocculated and aerated sludge,
- and means for reinjecting the centrate into the biological reactor or upstream of the biological reactor.

14. The device as claimed in claim 13, wherein it further comprises an intermediate chamber between the second and third chambers, and means for injecting air downstream of the first injection into said intermediate chamber.

15. The device as claimed in claim 13, wherein the first and second restrictions is each a venturi restriction.

16. The device as claimed in claim 13, wherein the second chamber is a column with a mean diameter d and a height $H \geq 10\,d$.

* * * * *